(12) United States Patent
Eckert et al.

(10) Patent No.: US 9,211,836 B2
(45) Date of Patent: Dec. 15, 2015

(54) HEADLAMP ASSEMBLY OF A VEHICLE WITH HEADLAMP FASTENING DEVICE

(71) Applicant: GM Global Technology Operations LLC, Detroit, MI (US)

(72) Inventors: Heiko Eckert, Buedesheim (DE); Gregor Krieg, Hanau (DE); Ralph Schneider, Riedstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 86 days.

(21) Appl. No.: 13/649,227

(22) Filed: Oct. 11, 2012

(65) Prior Publication Data

US 2013/0088886 A1 Apr. 11, 2013

(30) Foreign Application Priority Data

Oct. 11, 2011 (DE) .......................... 10 2011 115 797

(51) Int. Cl.
*B60Q 1/068* (2006.01)
*B60Q 1/04* (2006.01)
*B60R 21/34* (2011.01)

(52) U.S. Cl.
CPC ............ *B60Q 1/0416* (2013.01); *B60Q 1/0425* (2013.01); *B60Q 1/0441* (2013.01); *B60Q 1/0491* (2013.01); *B60R 21/34* (2013.01)

(58) Field of Classification Search
CPC .. B60Q 1/0416; B60Q 1/0425; B60Q 1/0433; B60Q 1/0441; B60Q 1/0491; F21S 48/30; F21S 48/31
USPC .................................. 362/507, 528, 549, 523
See application file for complete search history.

(56) References Cited

U.S. PATENT DOCUMENTS

| 4,644,447 | A | * | 2/1987 | Sturtz et al. | 362/549 |
|---|---|---|---|---|---|
| 6,543,916 | B2 | * | 4/2003 | Shirai | 362/460 |
| 6,923,495 | B2 | | 8/2005 | Kishikawa et al. | |
| 7,004,608 | B2 | * | 2/2006 | Goller | 362/546 |
| 7,040,793 | B2 | * | 5/2006 | Chase | 362/549 |
| 7,338,192 | B2 | | 3/2008 | Kreutzberg | |
| 7,401,957 | B2 | | 7/2008 | Kroll | |
| 7,517,121 | B2 | * | 4/2009 | Arlon et al. | 362/507 |
| 7,703,954 | B2 | | 4/2010 | Kusagaya | |

(Continued)

FOREIGN PATENT DOCUMENTS

| DE | 4133002 A1 | | 4/1993 |
|---|---|---|---|
| DE | 19632688 | * | 2/1997 |

(Continued)

OTHER PUBLICATIONS

German Patent Office, German Search Report for German Application No. 10 2011 115 797.6 dated Jul. 4, 2012.

*Primary Examiner* — Peggy Neils
(74) *Attorney, Agent, or Firm* — Ingrassia Fisher & Lorenz PC (57) ABSTRACT

A headlamp assembly of a vehicle with a headlamp fastening device is described. The headlamp assembly has a transparent headlamp cover on a front side. A headlamp housing is closed on the front side by the headlamp cover. The headlamp assembly is configured to mechanically connect with the vehicle body via the headlamp fastening device. The headlamp fastening device has a guide rail, on which the headlamp assembly is arranged so as to be pivotable contrary to the direction of travel and so as to be able to be withdrawn in the direction of travel.

20 Claims, 5 Drawing Sheets

(56) References Cited

U.S. PATENT DOCUMENTS

| | | | |
|---|---|---|---|
| 7,946,745 B2 * | 5/2011 | Baert et al. | 362/549 |
| 2001/0046140 A1 * | 11/2001 | Chase et al. | 362/549 |
| 2003/0179588 A1 | 9/2003 | Goller | |
| 2007/0279925 A1 * | 12/2007 | Jocher | 362/512 |
| 2008/0130301 A1 * | 6/2008 | Kusagaya | 362/466 |

FOREIGN PATENT DOCUMENTS

| | | |
|---|---|---|
| DE | 19741522 A1 | 3/1999 |
| DE | 102004030731 A1 | 2/2006 |
| DE | 102007062135 A1 | 6/2009 |
| DE | 102007062434 A1 | 6/2009 |
| DE | 102008012667 A1 | 9/2009 |
| DE | 2012005496 A1 | 11/2012 |
| EP | 1346874 A1 | 9/2003 |
| EP | 2017166 A1 | 1/2009 |
| FR | 2901202 * | 11/2007 |
| FR | 2901202 A1 | 11/2007 |
| JP | 7237495 A | 9/1995 |
| JP | 2004237795 A | 8/2004 |
| KR | 20040064045 A | 7/2004 |

* cited by examiner

HEADLAMP ASSEMBLY OF A VEHICLE WITH HEADLAMP FASTENING DEVICE

CROSS-REFERENCE TO RELATED APPLICATION

This application claims priority to German Patent Application No. 10 2011 115 797.6, filed Oct. 11, 2011, which is incorporated herein by reference in its entirety.

TECHNICAL FIELD

The technical field relates to a headlamp assembly of a vehicle with a headlamp fastening device.

BACKGROUND

From the publication DE 41 33 002 A1 a fastening device is known for a motor vehicle headlamp assembly. The known headlamp assembly is able to be pre-mounted via a guide and a locking device on a fastening device which is constructed as a bracket. The locking arrangement is engaged in a locking position on the mounting of the headlamp assembly with the fastening device on reaching a final position, so that the locking arrangement is able to be unlocked from the exterior of the vehicle.

Provisions are made here so that the headlamp assembly is able to be removed from the body in the direction of travel on dovetail-shaped guide rails. Through this headlamp assembly which is displaceable in the direction of travel, it is not possible for the headlamps to be able to be accommodated in a yielding manner in the front region of the vehicle. In the case of an impact, the headlamps therefore remain in a stable position fixed on the dovetail-shaped guides and can therefore bring about injuries.

Accordingly, it is desirable to provide a greater safety in the region of the headlamp assembly in the case of impact accidents and to reduce the risks of injury in the region of the headlamp assemblies. Furthermore, other desirable features and characteristics of the present invention will become apparent from the subsequent detailed description and the appended claims, taken in conjunction with the accompanying drawings and the foregoing technical field and background.

SUMMARY

In one embodiment, a headlamp assembly of a vehicle with a headlamp fastening device is described. The headlamp assembly has a transparent headlamp cover on the front side. A headlamp housing is closed on the front side by the headlamp cover. The headlamp assembly is able to be connected mechanically with the vehicle body via the headlamp fastening device. The headlamp fastening device has a guide rail on which the headlamp assembly is arranged pivotably contrary to the direction of travel and able to be withdrawn in the direction of travel.

This headlamp assembly with a headlamp fastening device not only has the advantage that it is able to be withdrawn in the direction of travel, so that a changing of defective light fittings is able to be carried out more easily, but also has the advantage that the headlamp assembly pivots contrary to the direction of travel in the case of an accident and is therefore yielding, so that the risks of injury which are represented by a headlamp assembly which is fixed or is only able to be withdrawn towards the front, are reduced. In addition, through the headlamp fastening device the yieldingness is able to be adapted almost without restriction to the requirements of the impact protection. Rubber-elastic plastics such as elastomers in particular in the region of the headlamp housing can further improve here the yieldingness of the headlamp assembly.

In one embodiment, the guide rail is provided in the region of the headlamp assembly with a mounting slot for a front bumper, wherein the mounting slot defines a joint width between a lower edge of a headlamp and an upper edge of the front bumper. Through this precise allocation of the edges of the front bumper and of the lower outlines of the headlamp it is possible to provide and to minimize in a defined manner the joint width between the front bumper and the headlamp assembly with the aid of the guide rail.

Thereby, a continuous transition is provided from the upper edge of the front bumper to the lower edge and the area of the transparent headlamp cover on the front side, so that the risk of injury can also be reduced, especially as no sharp edges are present in the joint region between headlamp and bumper. Also, the alignment of an engine hood to the headlamps, owing to the defined arrangement of the guide rail of the headlamp fastening device, can contribute to the fact that the joint width between the front edge of the hood and the upper edge of the headlamp assembly is minimized such that here also a smooth transition becomes possible, in order to reduce the risk of injury. Also, the distance or respectively the joint width to the fender can be minimized with the aid of the guide rail, which is provided for fastening the headlamp, so that in addition the overall joint representation in the front region enables a more uniform and more even frontal view of the vehicle.

Through further structural measures it is, moreover, possible that the headlamp can be pivoted away contrary to the direction of travel. For this, support elements are provided as mounting structures on the guide rail to receive spherical pivot elements on the base of the headlamp housing. These support elements are arranged spaced apart from one another on the guide rail and are aligned such that a pivot axis is produced, about which the headlamp can pivot contrary to the direction of travel in the case of an impact accident.

In addition, the support elements may have mounting structures to receive spherical pivot elements on the base of the headlamp housing. These mounting structures can be constructed in the shape of a spherical shell, in order to receive the spherical pivot elements into the spherical shells in the base of the headlamp housing.

On the other hand, upstream detent noses may constitute an unlatching- and latching resistance, which must respectively be overcome for the withdrawal of the headlamps in the direction of travel, and on the other hand is likewise to be overcome on pressing the headlamps into their installation position.

Whilst such spherical mounts or respectively ball joints are provided on the base of the headlamp assembly, in order to ensure both a withdrawal and also an installing of the headlamps and in addition a pivoting back of the headlamp assembly, lugs are provided on the upper edge of the headlamp assembly, which are screwed onto a cross member of the vehicle body, whereby the headlamp assembly is detachably fixed on the vehicle body. These lugs are configured such that predetermined breaking points are provided, which already in the case of a small amount of stress enable a pivoting of the headlamp assembly contrary to the direction of travel.

Also, the mentioned ball shells which hold ball joints in the base region of the headlamp housing can be overloaded on pivoting back. For this, predetermined breaking points are provided on the support elements, so that they break in the case of increasing impact pressure.

Moreover, in a further embodiment, the pivot elements are connected with the base of the headlamp housing via webs. These webs can also yield and serve to displace the pivot point further toward the rear contrary to the direction of travel, in order to configure the yieldingness of the headlamp assembly and the pivot process such that the surface of the headlamp cover on the front side pivots backwards over a large area.

Furthermore, screw connections fix the lugs of the headlamp housing, having predetermined breaking points, on the vehicle body. Here, an upper cross beam of the vehicle body in the front region of the vehicle is used, onto which these lugs are detachably fixed via screw connections. Whilst the predetermined breaking points of the lugs are arranged in the upper edge region of the headlamp housing, the predetermined breaking points of the pivot joint mounts of the support elements are provided in the region of the housing base.

In a further embodiment, the calibration of the predetermined breaking points is provided such that the predetermined breaking points of the lugs are designed to be weaker than the predetermined breaking points of the pivot joint positions. This means that in the case of an impact, firstly the predetermined breaking points of the lugs rupture and the headlamp can pivot towards the rear and then, when a predetermined pivot angle is exceeded, the predetermined breaking points in the spherical shells of the pivotable joint mounts on the support elements in the base region of the headlamp housing will also break and will free the headlamp displaceably contrary to the direction of travel.

A vehicle with a headlamp assembly, as described above, provides an impact protection which is yielding and pivotable and can be arranged on a guide rail. Moreover, such a vehicle can have joints between the headlamp of the headlamp assembly and a front shock absorber cover, between the headlamp and a fender and between the headlamp and an engine hood, which are minimized in their dimensions, especially as also the components arranged adjacent to the headlamp assembly, such as fender, engine hood and bumper are arranged in relation to the guide rails. Therefore, the tolerances can be reduced in relation to the joint widths.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the disclosure or the application and uses. Furthermore, there is no intention to be bound by any theory presented in the preceding background or the following detailed description.

Figure 1:
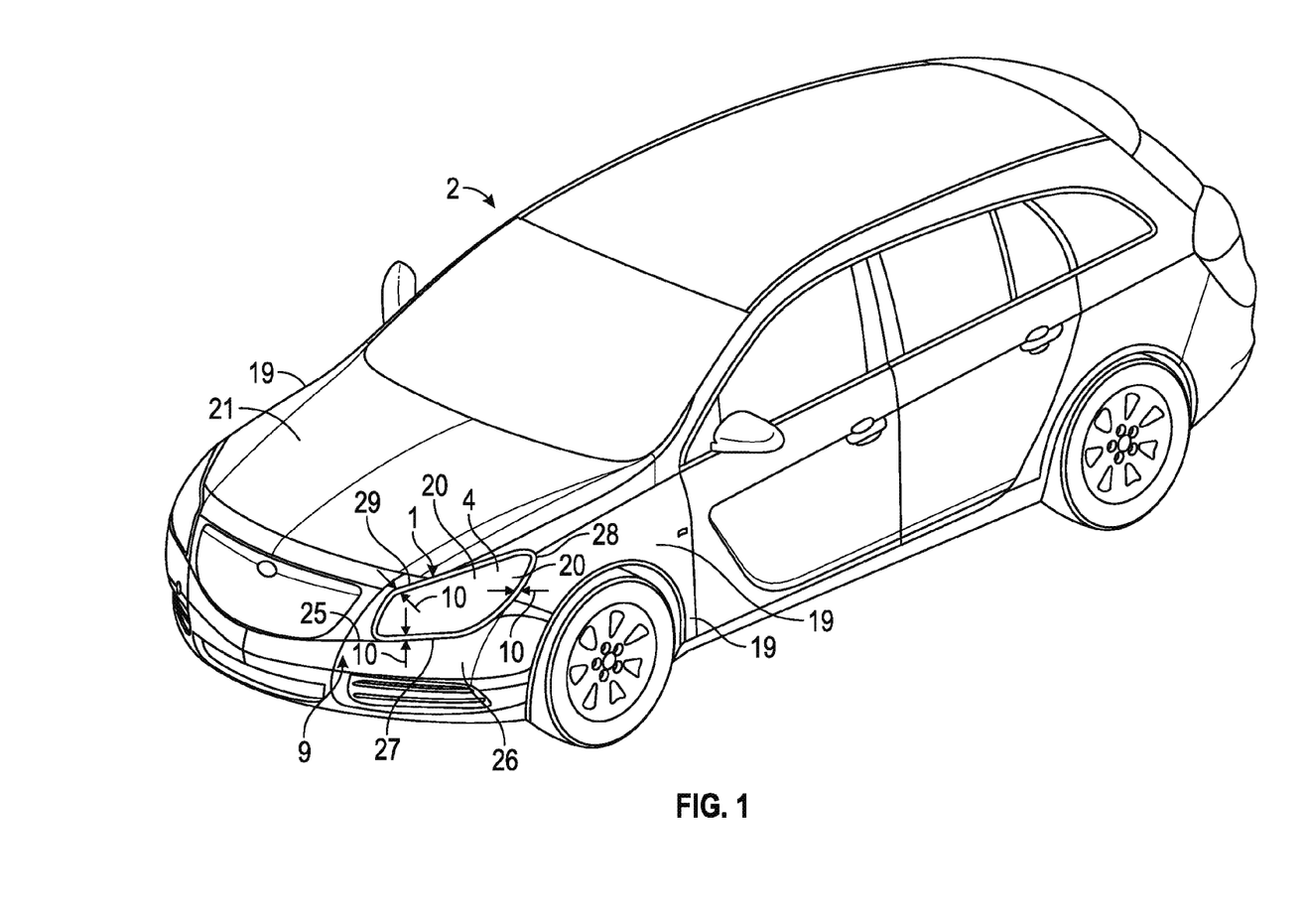
FIG. 1 shows a diagrammatic perspective view of a vehicle with a headlamp assembly according to an exemplary embodiment.

FIG. 1 shows a diagrammatic perspective view of a vehicle 2 with a headlamp assembly 1 in the headlamp fastening device 3, wherein only a transparent headlamp cover 4 of the headlamp assembly 1 is to be seen, which covers a headlamp housing 4 on the front side. The transparent headlamp cover 4 is delimited in a lower region by an upper edge 25 of a front bumper 9, wherein a transition joint 27 with a joint width 10 is constructed between an outer cover 26 of the front bumper 9 and the headlamp cover 4.

A fender 19 adjoins the outer sides of the headlamp cover 4 via a further transition joint 28. In an upper region of the headlamp cover 4 a further transition joint 29 is produced to an engine hood 21. In order to minimize these joints and nevertheless to make it possible that a headlamp 20 of the headlamp cover 4 is to be withdrawn from the headlamp fastening device, which is not to be seen in this figure, and that the headlamp 20 can pivot back in the case of an impact accident, the headlamp fastening device has a guide rail which is explained in further detail in the following figures.

The guide rail is fixed transversely to the direction of travel on the vehicle body. The guide rail guides and carries respectively a headlamp 20, so that in the state shown in FIG. 1 the transition joints 27, 28 and 29 are reduced to a minimum. In the case of an impact accident therefore a catching or jamming in or on the transition joints is avoided. In addition, an improved overall joint pattern is produced in the front view of the vehicle.

Figure 2:
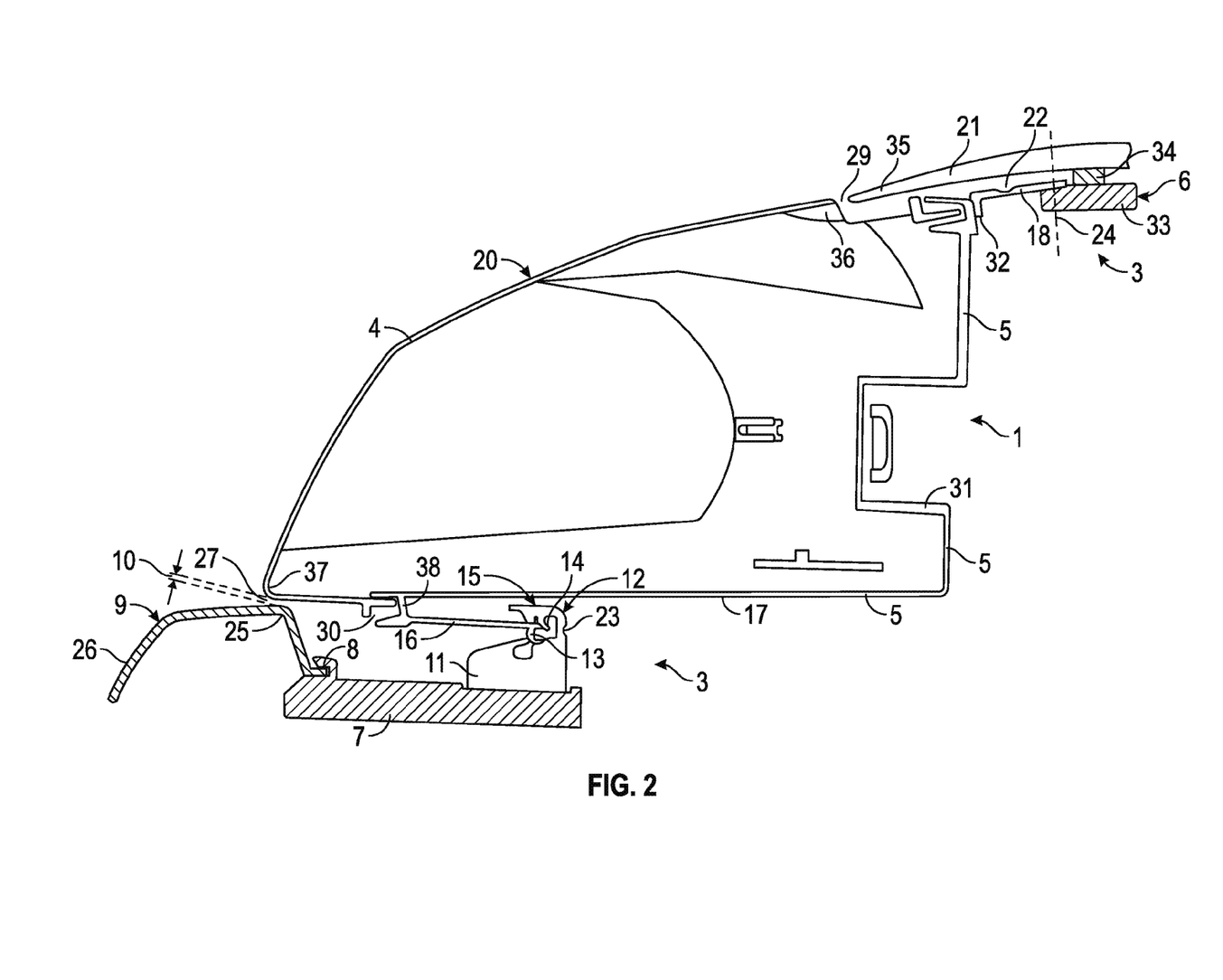
FIG. 2 shows a diagrammatic cross-section through the headlamp assembly according to the exemplary embodiment.

FIG. 2 shows a diagrammatic perspective cross-section of the headlamp assembly 1 according to the embodiment. In addition to the transparent headlamp cover 4 of the headlamp 20, this cross-section also shows the headlamp housing 5. The headlamp housing 5 is closed on the front side by the headlamp cover 4 in a media-tight manner by an adhesive seal 30. The headlamp housing 5 has a rear side 31, from which the headlamp 20 can be equipped with corresponding headlamp lights. In addition, the headlamp housing 5 has a base 17, which closes off the headlamp 20 in its lower region and protects the headlamp assembly 1 from dirty water.

In the position of the headlamp 20 shown in FIG. 2, an upper edge 32 of the rear side 31 of the headlamp housing 5 is fixed via lugs 18 on an upper front-side cross beam 33 of the vehicle body 6 mechanically via detachable connections 24, such as screw connections, for example. The lugs 18 on the upper edge 32 of the headlamp housing 5 have predetermined breaking points 22, which can already yield and break in the case of a low stress.

Moreover, an elastic buffer 34 is arranged on the cross beam 33, which supports the engine hood 21, wherein the engine hood 21 is locked on a lower cross beam 33 such that a minimal transition joint 29 is produced between the edge 35 of the engine hood 21 on the front side and an upper edge 36 of the headlamp cover 4.

Whilst the headlamp assembly 1 is detachably fixed by the lug 18, provided with a predetermined breaking point 22, on the vehicle body 6, the base 17 of the headlamp housing 5 is held by two support elements 11, which are fixed transversely to the direction of travel adjacent to one another and spaced apart on the guide rail 7 which is aligned transversely to the direction of travel. These support elements 11 have a mounting structure 12 for a web 16 of the headlamp assembly 1 in the base region of the headlamp housing 5.

The web 16 is connected at a front-side end with a front-side edge 38 of the base 17 of the headlamp housing 5 and has at a free end a spherical pivot element 13. The pivot element 13 is held pivotably in the mounting structure 12 of the support element 11 by means of detent noses 14. With the aid of the web 16, the pivot point on the base 17 of the headlamp housing 5 can be adapted to the outer contour of the headlamp cover 4, so that an optimum rearwardly-directed pivoting of the headlamp 20 is possible.

In order to also secure the joint width 10 of the transition joint 27 between an upper edge 25 of the outer cover 26 of the bumper 9 in relation to a lower edge 37 of the transparent headlamp cover 4, the outer cover 26 is fixed mechanically with its upper edge 25 in a mounting slot 8 of the guide rail 7 aligned substantially transversely to the direction of travel.

As the guide rail 7 is connected with the body, the transition joint to the fenders, which is not shown in FIG. 2, can also be optimally reduced, in order to fulfill the requirements for a minimizing of injury in the case of impact accidents and at the same time to provide a front-side, improved overall joint pattern of the vehicle in the headlamp region through the headlamp assembly 1.

Figure 3:
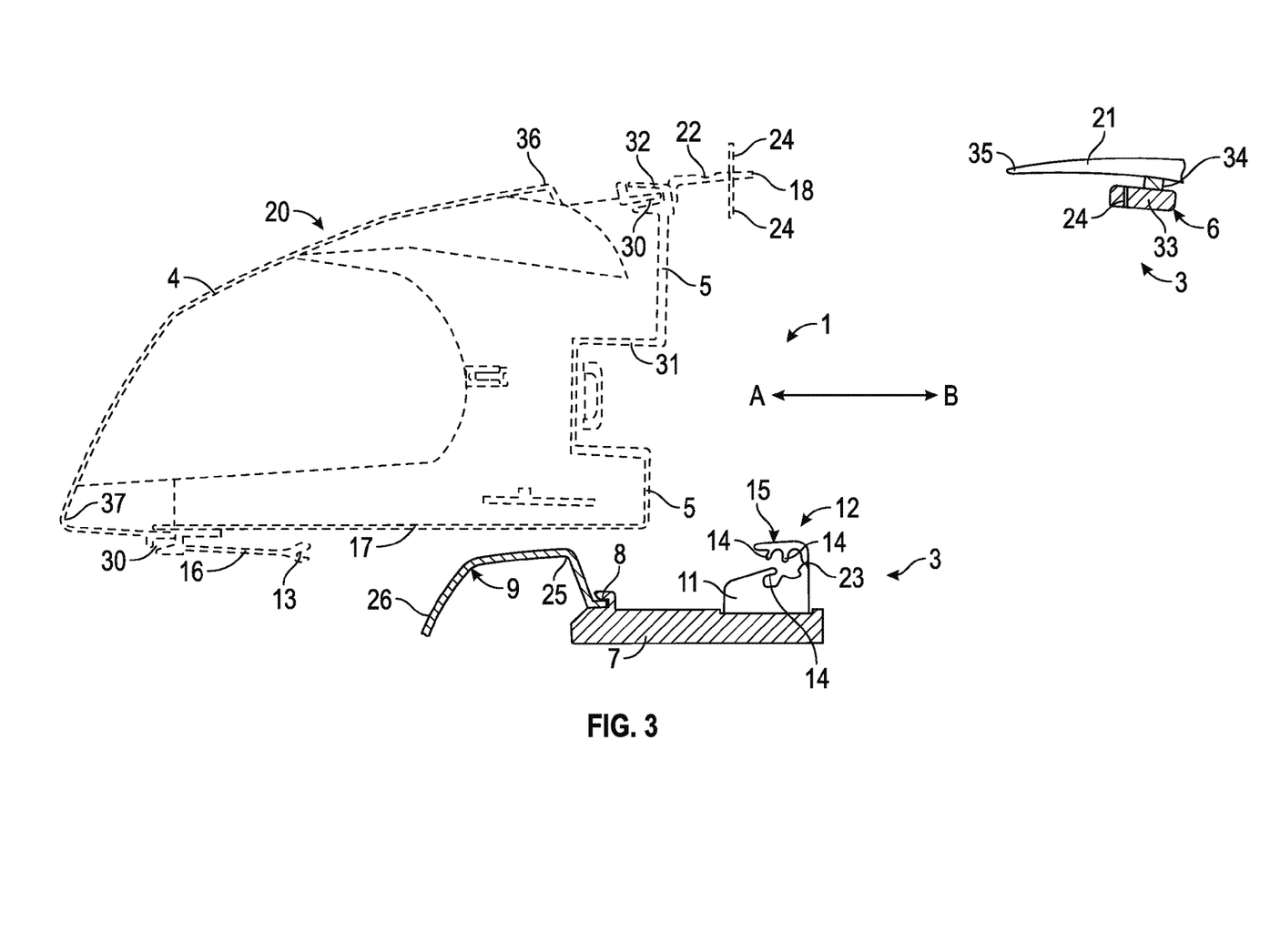
FIG. 3 shows a diagrammatic cross-section through the headlamp assembly according to FIG. 2 after withdrawal of a headlamp from its support elements.

FIG. 3 shows a diagrammatic cross-section of the headlamp assembly 1 according to FIG. 2 after withdrawal of the headlamp 20 in direction A from its two support elements 11. Only one of the support elements 11 can be seen in the views of FIGS. 2 to 5, whilst the other is arranged at a distance from the shown support element 11, above or below the plane of the drawing at a distance from the shown support element 11 on the guide rail 11 such that the pivot joint positions 15 of the two support elements 11 are aligned. The pivot joint positions 15 of the support elements 11 have detent noses 14, which arrest an engagement of the spherical pivot element 13, which is mechanically connected via the web 16 with the headlamp housing base 17, on pushing in the headlamp 20 in direction B, and constitute a resistance which is able to be overcome when the headlamp 20 is withdrawn in arrow direction A, as shown in FIG. 3, from the support elements 11.

Before such a headlamp arrangement can be withdrawn, for example for changing the headlamp lights, the detachable connections 24 of the lugs 18 arranged on the upper edge 32 of the rear side 31 of the headlamp housing 5, with the engine hood 21 opened, are to be detached from the body 6 or respectively from the cross beam 33 of the body 6. This detachable connection 24 can be a simple screw connection or have a clip connection with corresponding snap hooks, which on pushing-in of the headlamp 20 in direction B engage in a timely manner with the lower spherical pivot element 13 and fix the headlamp on the upper edge 32 and on the base 17 of the headlamp housing 5.

Figure 4:
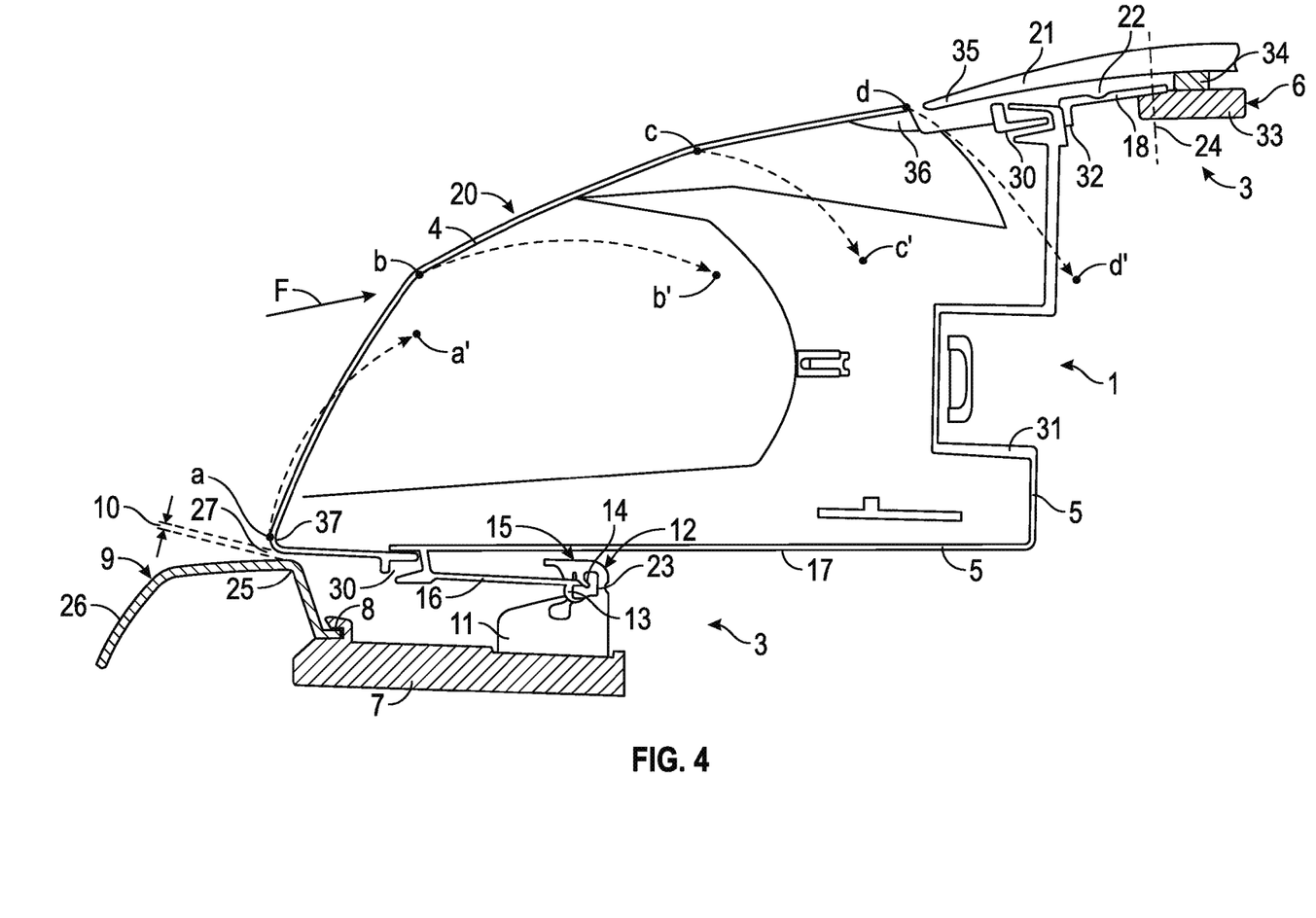
FIG. 4 shows a diagrammatic cross-section of the headlamp assembly according to FIG. 2 on the impact of a pedestrian in arrow direction F.

FIG. 4 shows a diagrammatic cross-section of the headlamp assembly 1 according to FIG. 2 on the impact of an object in arrow direction F. Here, the predetermined breaking point 22 of the lug 18 can fracture and free a pivoting of the headlamp 20 with its transparent headlamp cover 4, so that the points a, b, c and d, situated on the upper side of the headlamp cover 4, move in the direction a', b', c' and d', because the entire headlamp 20 is pivoted rearwards around the pivot elements 13. In addition to the upper predetermined breaking points 22 on the upper edge 32 of the rear side 31 of the headlamp housing 5, lower predetermined breaking points 23 are provided on the support elements 11, which yield in the case of increased impact force or in the case of extreme pivoting angles.

The predetermined breaking points 22 and 23 are dimensioned here such that firstly the weaker predetermined breaking points 22 yield and the lower predetermined breaking points 23 in the region of the base 17 of the headlamp housing 5 only also break in the case of a greater impact force. This difference between the upper predetermined breaking points 22 and the lower predetermined breaking points 23 is provided so that the lower predetermined breaking points 23 do not already rupture if the headlamp 20 is merely pushed back into the mounting structure 12 of the support elements 11 after a replacing of headlamp lights.

Figure 5:
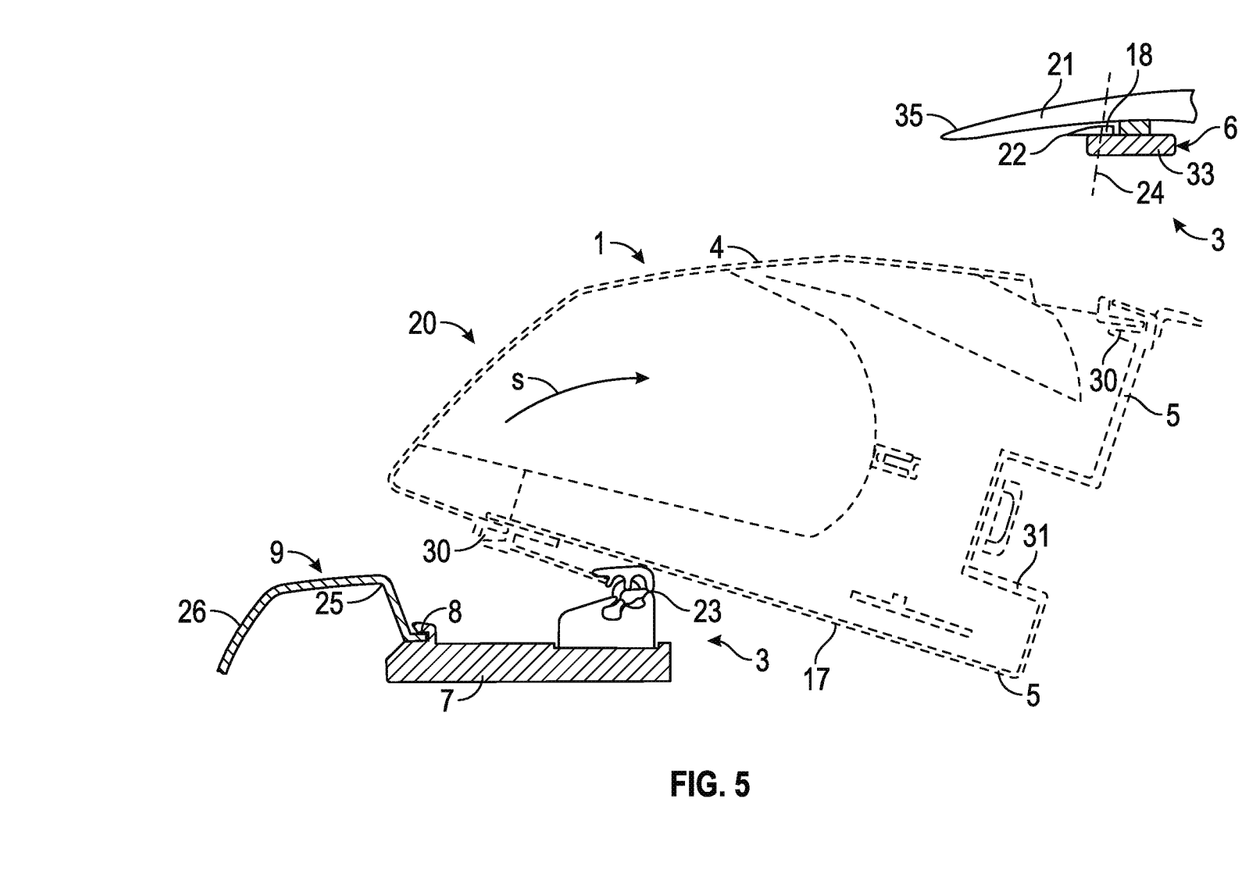
FIG. 5 shows a diagrammatic cross-section of the headlamp assembly according to FIG. 4 after the impact and the response of upper predetermined breaking points.

FIG. 5 shows a diagrammatic cross-section of the headlamp assembly 1 according to FIG. 4 after the impact and the response of the upper predetermined breaking point 22. Here, a pivoting movement of the headlamp 20 will occur in arrow direction S about the pivot axis of the two support elements 11 on the guide rail 7. When the impact becomes distinctly greater, the lower predetermined breaking point 23 of the support elements 11 can also yield, in order to further reduce the risk of injury.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A headlamp assembly of a vehicle with a headlamp fastening device, comprising:
   a transparent headlamp cover on a front side;
   a headlamp housing, which is closed on the front side by the headlamp cover and configured to mechanically connect with the vehicle body via the headlamp fastening device;
   wherein the headlamp fastening device has a guide rail on which the headlamp assembly is arranged so as to be pivotable contrary to the direction of travel and so as to be able to be withdrawn in the direction of travel, wherein the guide rail has two support elements spaced apart from one another on which the headlamp assembly is mounted so as to be pivotable and/or so as to be able to be withdrawn, and wherein the support elements have mounting structures for the mounting of spherical pivot elements on the base of the headlamp housing, and
   wherein the headlamp housing is pivotably mounted to the guide rail, and
   wherein the guide rail has a mounting slot for a front bumper in the region of the headlamp assembly, wherein the mounting slot defines a joint width between the headlamp assembly and the front bumper.

2. A headlamp assembly of a vehicle with a headlamp fastening device, comprising:
   a transparent headlamp cover on a front side;
   a headlamp housing, which is closed on the front side by the headlamp cover and configured to mechanically connect with the vehicle body via the headlamp fastening device;
   wherein the headlamp fastening device has a guide rail on which the headlamp assembly is arranged so as to be pivotable contrary to the direction of travel and so as to be able to be withdrawn in the direction of travel, wherein the guide rail has two support elements spaced apart from one another on which the headlamp assembly is mounted so as to be pivotable and/or so as to be able to be withdrawn, and wherein the support elements have mounting structures for the mounting of spherical pivot elements on the base of the headlamp housing, and
   wherein the headlamp housing is pivotably mounted to the guide rail, and wherein the mounting structures have detent noses, which hold the pivot elements so as to be able to be unlatched in the pivot joint positions of the support elements.

3. The headlamp assembly according to claim 1, wherein the support elements have pivot joint mounts, arranged in alignment to one another, for the mounting of the pivot elements.

4. The headlamp assembly according to claim 1, wherein the pivot elements are connected via webs with the base of the headlamp housing.

5. The headlamp assembly according to claim 1, wherein the headlamp housing is mechanically connected in an upper region with the vehicle body via lugs.

6. The headlamp assembly according to claim 5, wherein the lugs have predetermined breaking points.

7. The headlamp assembly according to claim 6, wherein screw connections fix the lugs, having predetermined breaking points, of the headlamp housing on the vehicle body.

8. The headlamp assembly according to claim 3, wherein predetermined breaking points are arranged in the pivot joint mounts of the support elements.

9. The headlamp assembly according to claim 8, wherein the predetermined breaking points of the lugs are configured to be weaker than the predetermined breaking points of the pivot joint positions.

10. A vehicle with a headlamp assembly according to claim 1, wherein a headlamp of the headlamp assembly is arranged as impact protection in a yielding and pivotable manner on a guide rail.

11. The vehicle according to claim 10, wherein joints are minimized between the headlamp and a fender and between the headlamp and an engine hood.

12. The headlamp assembly according to claim 2, wherein the support elements have pivot joint mounts, arranged in alignment to one another, for the mounting of the pivot elements.

13. The headlamp assembly according to claim 12, wherein predetermined breaking points are arranged in the pivot joint mounts of the support elements.

14. The headlamp assembly according to claim 2, wherein the pivot elements are connected via webs with the base of the headlamp housing.

15. The headlamp assembly according to claim 2, wherein the headlamp housing is mechanically connected in an upper region with the vehicle body via lugs.

16. The headlamp assembly according to claim 15, wherein the lugs have predetermined breaking points.

17. The headlamp assembly according to claim 16, wherein screw connections fix the lugs, having predetermined breaking points, of the headlamp housing on the vehicle body.

18. The headlamp assembly according to claim 17, wherein the predetermined breaking points of the lugs are configured to be weaker than the predetermined breaking points of the pivot joint positions.

19. A vehicle with a headlamp assembly according to claim 2, wherein a headlamp of the headlamp assembly is arranged as impact protection in a yielding and pivotable manner on a guide rail.

20. The vehicle according to claim 19, wherein joints are minimized between the headlamp and a fender and between the headlamp and an engine hood.

* * * * *